US010795177B2

(12) United States Patent
Mukhtarov et al.

(10) Patent No.: US 10,795,177 B2
(45) Date of Patent: Oct. 6, 2020

(54) PRISM SHEET FOR AUTO-STEREOSCOPIC 3D DISPLAY AND DISPLAY DEVICE INCLUDING SAME

(71) Applicant: SAMSUNG ELECTRONICS CO., LTD., Suwon-si (KR)

(72) Inventors: Farid Mukhtarov, Suwon-si (KR); Ki-hyung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/531,957

(22) PCT Filed: Dec. 11, 2015

(86) PCT No.: PCT/KR2015/013568
§ 371 (c)(1),
(2) Date: May 31, 2017

(87) PCT Pub. No.: WO2016/105005
PCT Pub. Date: Jun. 30, 2016

(65) Prior Publication Data
US 2017/0329150 A1    Nov. 16, 2017

(30) Foreign Application Priority Data
Dec. 22, 2014    (KR) .................. 10-2014-0185719

(51) Int. Cl.
*H04N 13/00*   (2018.01)
*G02B 30/36*   (2020.01)
(Continued)

(52) U.S. Cl.
CPC ............. *G02B 30/36* (2020.01); *G02B 5/045* (2013.01); *G02B 30/26* (2020.01); *G02F 1/1335* (2013.01);
(Continued)

(58) Field of Classification Search
CPC .... H04N 13/00; H04N 13/106; H04N 13/324; H04N 13/315; H04N 13/341; H04N 13/359; H04N 13/305; H04N 13/361
See application file for complete search history.

(56) References Cited

U.S. PATENT DOCUMENTS 5,949,526 A  *  9/1999  Koguchi ............ H04N 1/40031
                                                       355/41
6,064,424 A     5/2000  van Berkel et al.
(Continued)

FOREIGN PATENT DOCUMENTS

CN          1530691 A     9/2004
CN       201159797 Y    12/2008
(Continued)

OTHER PUBLICATIONS

Search Report (PCT/ISA/210) dated Apr. 5, 2016, issued by the International Searching Authority in counterpart International Application No. PCT/KR2015/013568.
(Continued)

*Primary Examiner* — Frank F Huang
(74) *Attorney, Agent, or Firm* — Sughrue Mion, PLLC

(57) ABSTRACT

The present invention relates to a prism sheet for auto-stereoscopic 3D display that is installed on the top of a liquid crystal display panel. The prism sheet for auto-stereoscopic 3D display according to the present invention, comprises a plurality of prisms disposed parallel to each other, each of which includes a central portion of which the upper and lower surfaces are parallel to each other, the central portion having a width corresponding to a plurality of subpixel columns of the liquid crystal display panel; a left inclined portion that is installed on a left side of the central portion and refracts light such that a user can view the left half of the plurality of subpixel columns covered by the central portion, wherein the left half subpixel column is visible to a user; and
(Continued)

a right inclined portion that is installed on a right side of the central portion and refract light such that the user can view the right half of the plurality of subpixel columns covered by the central portion.

7 Claims, 11 Drawing Sheets

(51) Int. Cl.
*G02F 1/1335* (2006.01)
*G02B 30/26* (2020.01)
*H04N 13/383* (2018.01)
*H04N 13/324* (2018.01)
*H04N 13/398* (2018.01)
*G02B 5/04* (2006.01)

(52) U.S. Cl.
CPC ..... *G02F 1/133504* (2013.01); *H04N 13/324* (2018.05); *H04N 13/383* (2018.05); *H04N 13/398* (2018.05); *G02F 2201/52* (2013.01); *H04N 2213/001* (2013.01)

(56) References Cited

U.S. PATENT DOCUMENTS

| | | | |
|---|---|---|---|
| 7,359,120 B1* | 4/2008 | Raymond | G02B 27/2214 |
| | | | 359/619 |
| 7,564,507 B2 | 7/2009 | Park | |
| 7,635,200 B2 | 12/2009 | Atsushi | |
| 8,068,187 B2 | 11/2011 | Huizinga et al. | |
| 8,149,348 B2 | 4/2012 | Yun et al. | |
| 8,659,830 B2 | 2/2014 | Brott et al. | |
| 9,087,470 B2 | 7/2015 | Hur et al. | |
| 9,116,357 B2* | 8/2015 | Chen | G02B 27/2214 |
| 9,239,508 B2 | 1/2016 | Feng et al. | |
| 2004/0174472 A1 | 9/2004 | Park | |
| 2005/0068590 A1* | 3/2005 | Shiota | B41J 2/45 |
| | | | 358/474 |
| 2008/0284945 A1 | 11/2008 | Schultz et al. | |
| 2009/0262420 A1 | 10/2009 | Yun et al. | |
| 2010/0188584 A1* | 7/2010 | Liu | G06T 7/50 |
| | | | 348/699 |
| 2011/0149125 A1* | 6/2011 | Morimoto | H04N 5/225 |
| | | | 348/272 |
| 2012/0050562 A1* | 3/2012 | Perwass | H04N 5/2254 |
| | | | 348/222.1 |
| 2012/0133647 A1 | 5/2012 | Wu et al. | |
| 2012/0154463 A1 | 6/2012 | Hur et al. | |
| 2012/0229896 A1 | 9/2012 | Allio | |
| 2012/0257407 A1* | 10/2012 | Demma | B60R 13/04 |
| | | | 362/602 |
| 2013/0113785 A1* | 5/2013 | Sumi | H04N 13/31 |
| | | | 345/419 |
| 2014/0002897 A1 | 1/2014 | Krijn et al. | |
| 2014/0055575 A1* | 2/2014 | Imamura | H04N 9/07 |
| | | | 348/49 |
| 2014/0132711 A1* | 5/2014 | Brown Elliott | H04N 13/106 |
| | | | 348/43 |
| 2014/0168562 A1 | 6/2014 | Feng et al. | |
| 2016/0252739 A1* | 9/2016 | Wei | H04N 13/31 |
| | | | 359/463 |

FOREIGN PATENT DOCUMENTS

| | | |
|---|---|---|
| CN | 101566729 A | 10/2009 |
| CN | 102572477 A | 7/2012 |
| KR | 10-2007-0000955 A | 1/2007 |
| KR | 10-2012-0069432 A | 6/2012 |
| KR | 10-2012-0095066 A | 8/2012 |
| KR | 10-2013-0020299 A | 2/2013 |
| KR | 10-2014-0074088 A | 6/2014 |
| KR | 10-2014-0077124 A | 6/2014 |
| KR | 10-1451933 B1 | 10/2014 |

OTHER PUBLICATIONS

Written Opinion (PCT/ISA/237) dated Apr. 5, 2016, issued by the International Searching Authority in counterpart International Application No. PCT/KR2015/013568.

Communication dated Nov. 16, 2018, issued by the Korean Intellectual Property Office in counterpart Korean Patent Application No. 10-2014-0185719.

Communication dated May 29, 2019, issued by the Korean Intellectual Property Office in counterpart Korean Patent Application No. 10-2014-0185719.

Communication dated Mar. 16, 2020 issued by the State Intellectual Property Office of P.R. China in Chinese Application No. 201580070246.9.

Communication dated May 29, 2020 issued by the Indian Patent Office in Indian Application No. 201717020731.

* cited by examiner

PRISM SHEET FOR AUTO-STEREOSCOPIC 3D DISPLAY AND DISPLAY DEVICE INCLUDING SAME

TECHNICAL FIELD

The present disclosure relates to a glasses-free 3D display apparatus. More particularly, the present disclosure relates to a prism sheet for a glasses-free 3D display and a display apparatus provided with the same.

BACKGROUND ART

According to the development of electronic technologies, various types of electronic devices are being developed and distributed. In particular, various types of display apparatuses such as a TV, a smart phone, a mobile phone, a personal digital assistance (PDA), an MP3 player, a kiosk, an electronic photo frame, an electronic signboard, and electronic book, and the like are widely used.

Recently, three dimensional (3D) display systems capable of viewing stereoscopic contents have been developed and popularized. The 3D display systems may be broadly classified into a glasses-free type system that can be viewed without glasses and a glass type system that can be viewed with a pair of glasses.

The glass type system is applied to devices that many people can view, such as TVs and movie theaters. The glasses-free type system is applied to devices that users use alone, such as tablet computers, smartphones, and the like.

The parallax barrier method and the lenticular lens method are widely used in the glasses-free type system. In the lenticular lens method, a lenticular lens is disposed on the front surface of a display panel in accordance with the pixel structure of the display panel, so that each image included in the stereoscopic content is focused at a certain distance and can be separated and viewed.

However, such a lenticular lens method has a problem that strong Moire patterns appear and crosstalk occurs highly. Further, there is a problem that the lenticular lens method is difficult to be used in a liquid crystal display panel having a pentile structure.

DISCLOSURE

Technical Problem

The present disclosure has been made in view of the above-described problems, and relates to a prism sheet for a glasses-free 3D display which can prevent Moire pattern, prevent or minimize crosstalk, and be used in liquid crystal display panels of various structures, and a display apparatus using the same.

Technical Solution

According to an aspect of the present disclosure, a prism sheet for a glasses-free 3D display which is provided on an upper surface of a liquid crystal display panel, the prism sheet may include a plurality of prisms arranged in parallel, wherein each of the plurality of prisms may include a central portion including an upper surface and a lower surface that are parallel to each other, the central portion including a width corresponding to at least one subpixel column of the liquid crystal display panel; a left inclined portion provided on a left side of the central portion, the left inclined portion configured to refract a left half subpixel column of a plurality of subpixel columns covered by the central portion, wherein the left half subpixel column is visible to a user; and a right inclined portion provided on a right side of the central portion, the right inclined portion configured to refract a right half subpixel column of the plurality of subpixel columns covered by the central portion, wherein the right half subpixel column is visible to the user.

When the liquid crystal display panel includes a pentile pixel structure, the central portion may be formed to cover two subpixel columns of the liquid crystal display panel.

When the liquid crystal display panel includes a RGB pixel structure, the central portion may be formed to cover three subpixel columns of the liquid crystal display panel.

The left inclined portion may include a first left inclined surface and a second left inclined surface with different inclination angles, and each of the first and second left inclined surfaces may refract the left half subpixel column of the plurality of subpixel columns covered by the central portion, wherein the left half subpixel column is visible to the user.

The right inclined portion may include a first right inclined surface and a second right inclined surface with different inclination angles, and each of the first and second right inclined surfaces may refract the right half subpixel column of the plurality of subpixel columns covered by the central portion, wherein the right half subpixel column is visible to the user.

Each of the left inclined portion and the right inclined portion may include at least three inclined surfaces with different inclination angles.

The left inclined portion and the right inclined portion may be symmetrical with respect to a center line passing through a center of the central portion.

According to another aspect of the present disclosure, a display apparatus may include an input portion configured to receive a user command; a display; and a controller configured to control the display to output an image according to the user command, wherein the display may include a liquid crystal display panel; and a prism sheet for a glasses-free 3D display provided on a upper surface of the liquid crystal display panel and including at least one of the above-described features.

The display apparatus may include an eye tracking sensor configured to track a position of a user, wherein the controller may map data to be output to the liquid crystal display panel using coordinates of eyes of the user obtained from the eye tracking sensor.

The controller may control the liquid crystal display panel to output a margin between an image for a right eye and an image for a left eye.

BEST MODE

Hereinafter, certain exemplary embodiments of a prism sheet for a glasses-free 3D display according to the present disclosure and a display apparatus provided with the same will be described in detail with reference to the accompanying drawings.

It is to be understood that the embodiments described below are provided for illustrative purpose only, and that the present disclosure may be embodied with various modifications different form exemplary embodiments described herein. However, in the following description below, detailed description of well-known functions or components will be omitted when it may be unnecessary to obscure the subject matter of the present disclosure. Further, the accompanying drawings may be not drawn to scale in order to facilitate understanding of the disclosure, but the dimensions of some of the components may be exaggerated.

Figure 1:
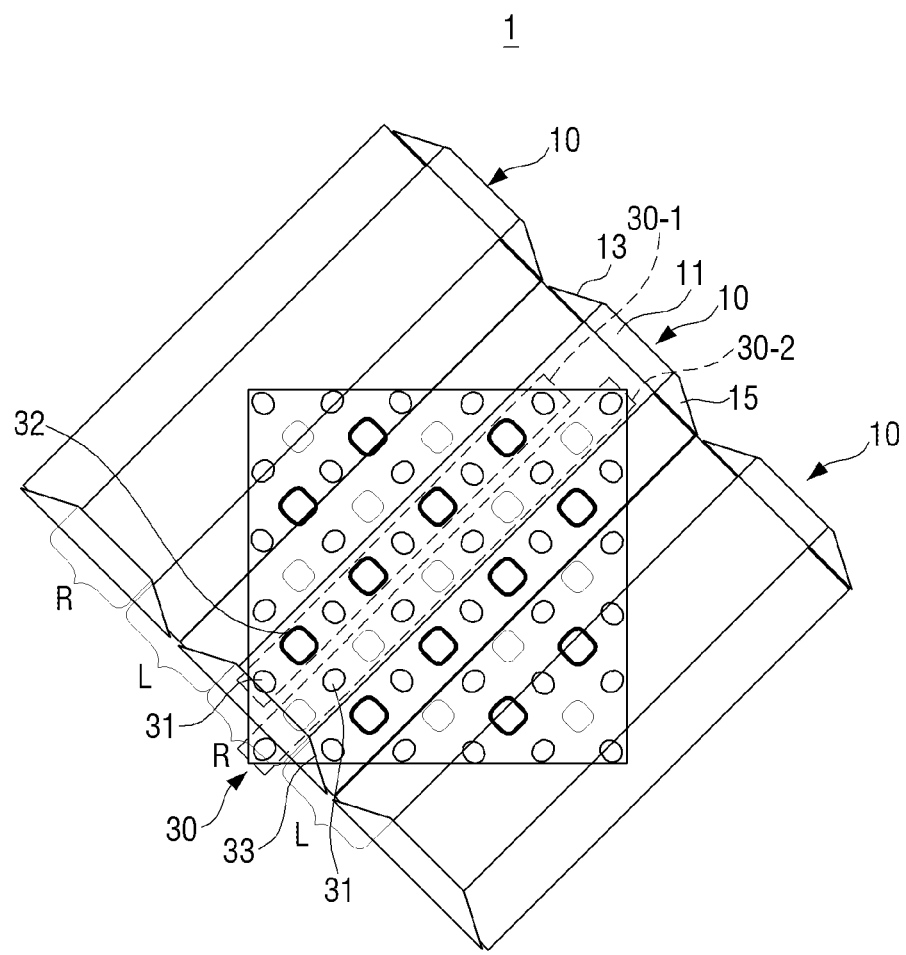
FIG. 1 is a partial perspective view illustrating a prism sheet for a glasses-free 3D display according to an embodiment of the present disclosure.
Figure 2:
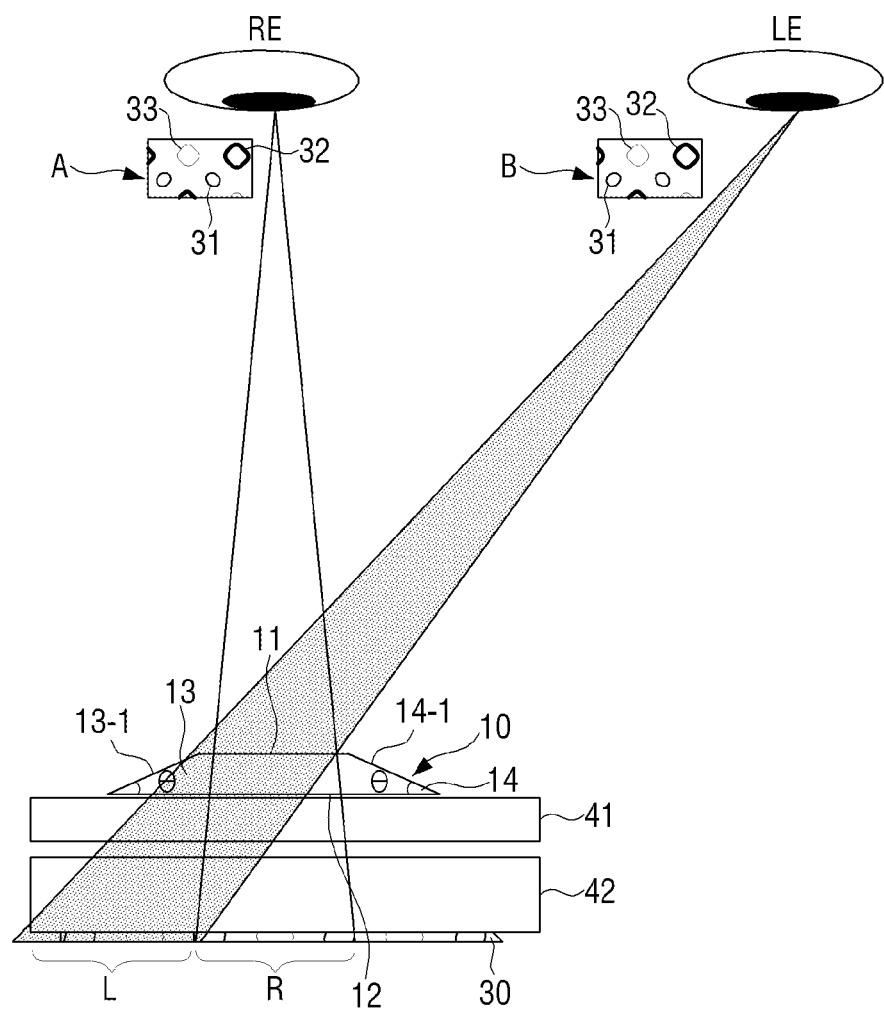
FIG. 2 is a view illustrating a case in which subpixels of a liquid crystal display panel are viewed through a prism sheet for a glasses-free 3D display according to an embodiment of the present disclosure.
Figure 3:
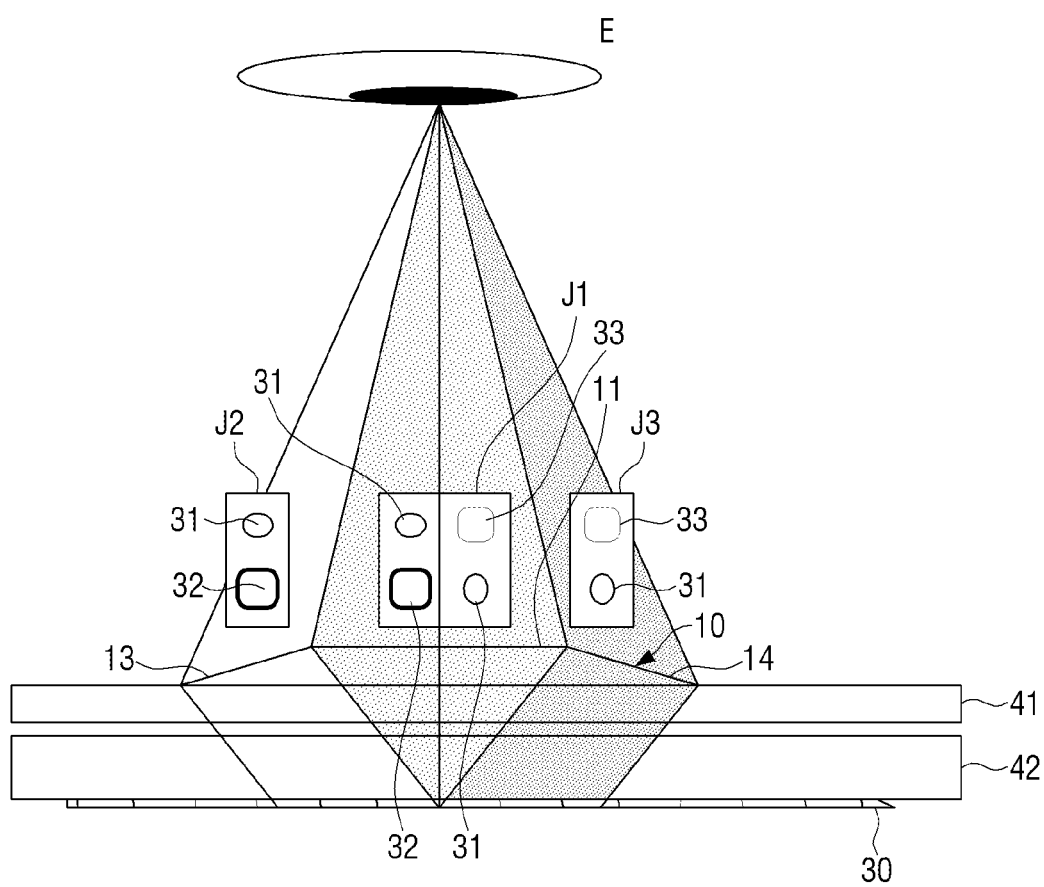
FIG. 3 is a cross-sectional view illustrating a case in which subpixels of a liquid crystal display panel are viewed through left and right inclined surfaces in a prism sheet for a glasses-free 3D display according to an embodiment of the present disclosure.
Figure 4:
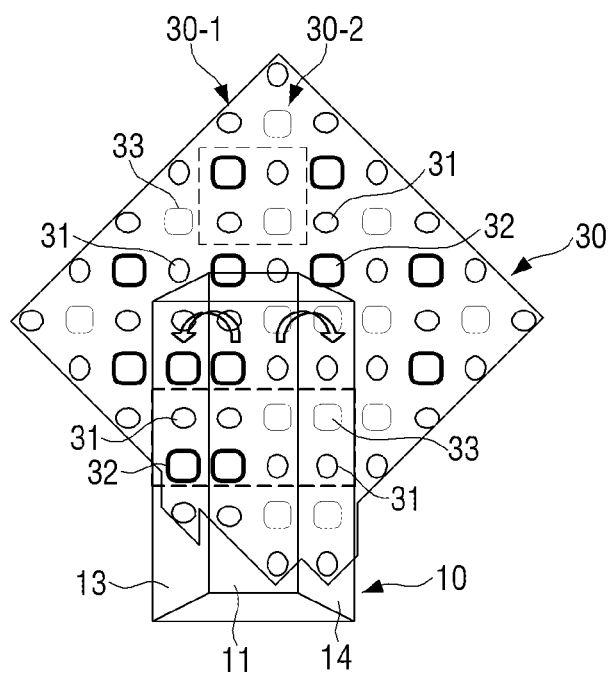
FIG. 4 is a view illustrating a case in which subpixels of a liquid crystal display panel are viewed through left and right inclined surfaces in a prism sheet for a glasses-free 3D display according to an embodiment of the present disclosure.

FIG. 1 is a partial perspective view illustrating a prism sheet for a glasses-free 3D display according to an embodiment of the present disclosure, FIG. 2 is a view illustrating a case in which subpixels of a liquid crystal display panel are viewed through a prism sheet for a glasses-free 3D display according to an embodiment of the present disclosure. FIG. 3 is a cross-sectional view illustrating a case in which subpixels of a liquid crystal display panel are viewed through left and right inclined surfaces in a prism sheet for a glasses-free 3D display according to an embodiment of the present disclosure, and FIG. 4 is a view illustrating a case in which subpixels of a liquid crystal display panel are viewed through left and right inclined surfaces in a prism sheet for a glasses-free 3D display according to an embodiment of the present disclosure.

Referring to FIG. 1, a prism sheet 1 for a glasses-free 3D display according to an embodiment of the present disclosure may include a plurality of prisms 10.

The plurality of prisms 10 is connected in parallel to each other, and forms a prism sheet 1. The prism sheet 1 is formed of a transparent material and has a size corresponding to the size of a liquid crystal display panel 30. For example, when the prism sheet 1 is applied to a tablet computer or a smartphone, the prism sheet 1 is formed to fit the screen size of the tablet computer or the smartphone. As illustrated in FIGS. 2 and 3, the prism sheet 1 is disposed on the upper surface of a cover glass 41 located on the upper side of the liquid crystal display panel 30. A touch sensor plate 42 is provided between the cover glass 41 and the liquid crystal display panel 30.

The prism 10 includes a central portion 11 and two inclined portions 13 and 14. The central portion 11 is formed in a rectangular column shape of which upper and lower surfaces are parallel to each other. The central portion 11 is formed to have a width W corresponding to at least one subpixel column of the liquid crystal display panel 30 in which the prism sheet 1 is to be used. When the structure of the liquid crystal display panel 30 is a pentile pixel structure, the central portion 11 of the prism 10 may have a width corresponding to two subpixel columns. Also, when the liquid crystal display panel 30 has an RGB pixel structure, the central portion 11 of the prism 10 may have a width corresponding to three subpixel columns.

In detail, as illustrated in FIG. 1, when the liquid crystal display panel 30 in which the prism sheet 1 is provided has the pentile pixel structure, for example, when the liquid crystal display panel 30 is an organic light emitting diode (OLED) display panel as illustrated in FIG. 1, the central portion 11 of the prism 10 is formed to cover the two subpixel columns 30-1 and 30-2. Accordingly, an image formed by the two subpixel columns 30-1 and 30-2 under the central portion 11 of the prism 10 is directly visible to the user (see J1 in FIG. 3). In FIG. 1, R represents a pixel column outputting an image for the right eye, and L represents a pixel column outputting an image for the left eye. In the pentile pixel structure, one pixel column is composed of two subpixel columns. Accordingly, as illustrated in FIG. 2, the left eye LE and the right eye RE of the user may see the image L for the left eye and the image R for the right eye through the prism 10 of the prism sheet 1. Accordingly, the user can view a 3D image through the prism sheet 1. At this time, as illustrated in FIG. 2, the user can see all of subpixels 31, 32, and 33 constituting one pixel. This is shown in the portions indicated by A and B in FIG. 2.

In the present embodiment, the central portion 11 of the prism 10 covers two subpixel columns 30-1 and 30-2, that is, the central portion 11 of the prism 10 is formed to have the width W corresponding to the two subpixel columns 30-1 and 30-2. However, the width W of the central portion 11 of the prism 10 is not limited to the above example. As another example, the width W of the central portion 11 of the prism 10 may be formed to cover three or more subpixel columns of the liquid crystal display panel 30.

The two inclined portions 13 and 14 extend from opposite side surfaces of the central portion 11. In the following description, in FIG. 2, the inclined portion 14 provided on the right side of the central portion 11 is referred to as a right inclined portion, and the inclined portion 13 provided on the left side of the central portion 11 is referred to as a left inclined portion. Therefore, the left and right inclined portions 13 and 14 may be formed in the form of a triangular pillar. The left inclined portion 13 and the right inclined portion 14 may be formed to be a line symmetry with respect to the center line of the central portion 11.

Each of the two inclined portions 13 and 14 may be formed to refract light such that the half subpixel columns from one side of the central portion 11 among the plurality of subpixel columns of the liquid crystal display panel 30 corresponding to the width W of the central portion 11 toward the user's eye so that the user can see the half subpixel columns. For example, as illustrated in FIGS. 1, 3, and 4, when the central portion 11 of the prism 10 has the width W corresponding to the two subpixel columns 30-1 and 30-2, the left inclined portion 13 retracts one subpixel column 30-1 on the left side of the two subpixel columns 30-1 and 30-2 corresponding to the central portion 11 to be visible to the user (see J2 in FIG. 3). Also, the right inclined portion 14 retracts one subpixel column 30-2 on the right side of the two subpixel columns 30-1 and 30-2 corresponding to the central portion 11 to be visible to the user (see J3 in FIG. 3). Here, that the user views the subpixel columns 30-1 and 30-2 means that the user views an image formed by the subpixel columns 30-1 and 30-2.

In detail, each of the inclined portions 13 and 14 includes a vertical surface tangent to one side surface of the central portion 11, a horizontal surface perpendicular to the vertical surface and coplanar with the bottom surface 12 of the central portion 11, and a inclined surface 13-1 and 14-1 connecting the ends of the vertical surface and the horizontal surface. The inclination angle θ of the inclined portions 13 and 14 is set such that the user can view an image formed by the half subpixel columns from one side of the central portion 11 among the plurality of subpixel columns of the liquid crystal display panel 30 corresponding to the central portion 11 through the inclined portion. In other words, the inclination angle θ of the inclined portions 13 and 14 is determined so that the image formed by half of the subpixel columns located under the central portion 11 is refracted toward the user's eye. The lengths of the horizontal surface and vertical surface of each of the inclined portions 13 and 14 may be determined in accordance with the inclination angle θ of the inclined portions 13 and 14.

Accordingly, when the two subpixel columns 30-1 and 30-2 of the liquid crystal display panel 30 located below the prism 10 output an image R for the right eye, as illustrated in FIG. 4, the left subpixel column 30-1 of the two subpixel columns 30-1 and 30-2 located below the central portion 11 of the prism 10 is visible to the right eye of the user through the left inclined surface 13-1 of the prism 10. The right subpixel column 30-2 of the two subpixel columns 30-1 and 30-2 located below the central portion 11 of the prism 10 is visible to the right eye of the user through the right inclined surface 14-1 of the prism 10. For example, in FIG. 4, in the case in which the two subpixel columns 30-1 and 30-2 of the liquid crystal display panel 30 corresponding to the central portion 11 of the prism 10 include a column of green-red subpixels 31 and 32 and a column of green-blue subpixels 31 and 33, the subpixel column corresponding to the left inclined portion 13 is the column of green-blue subpixels 31 and 33, and the subpixel column corresponding to the right inclined portion 14 is the column of green-red subpixels 31 and 32, when the user views the liquid crystal display panel 30 through the prism 10, the column of green-blue subpixels 31 and 33 located below the left inclined portion 13 is not visible due to refraction of the left and right inclined portions 13 and 14, and the column 30-1 of green-red subpixels 31 and 32 on the left of the two subpixel columns 30-1 and 30-2 located below the central portion 11 is visible. Also, the column of green-red subpixels 31 and 32 located below the right inclined portion 14 is not visible, and the column 30-2 of green-blue subpixels 31 and 33 on the right of the two subpixel columns 30-1 and 30-2 located below the central portion 11 is visible. In other words, when the prism sheet 1 according to the present disclosure is used, the image formed by the subpixel columns 30-1 and 30-2 corresponding to the central portion 11 of the prism 10 is dispersed and visible. Therefore, when using the prism sheet 1 according to the present disclosure, the resolution becomes better than when using the conventional lenticular lens. The resolution of the conventional lenticular lens is lower than that of when using the prism sheet 1 according to the present disclosure because the subpixels beneath the lenticular lens are seen to be enlarged.

In the above description, the left and right inclined portions 13 and 14 are formed in one inclined surface 13-1 and 14-1 having one inclination angle. However, the left and right inclined portions 13 and 14 may be formed in a plurality of inclined surfaces having different inclination angles. At this time, each of the plurality of inclined surfaces is formed so that the image formed by the subpixel columns corresponding to half of the subpixel columns of the liquid crystal display panel 30 corresponding to the central portion 11 of the prism 10 is refracted and visible to the user.

Hereinafter, a prism provided with left and right inclined portions having two inclined surfaces will be described with reference to FIGS. 5 and 6.

Figure 5:
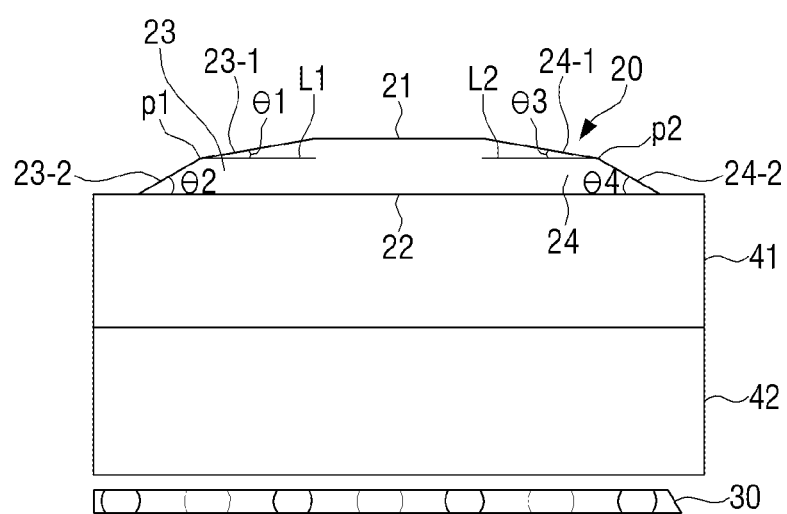
FIG. 5 is a cross-sectional view illustrating a display apparatus provided with a prism sheet for a glasses-free 3D display according to another embodiment of the present disclosure.

FIG. 5 is a cross-sectional view schematically illustrating a display apparatus provided with a prism sheet for a glasses-free 3D display according to another embodiment of the present disclosure. FIG. 6 is a view illustrating a case in which subpixels of a liquid crystal display panel are viewed through left and right inclined surfaces of a prism in a prism sheet for a glasses-free 3D display according to another embodiment of the present disclosure.

Figure 6:
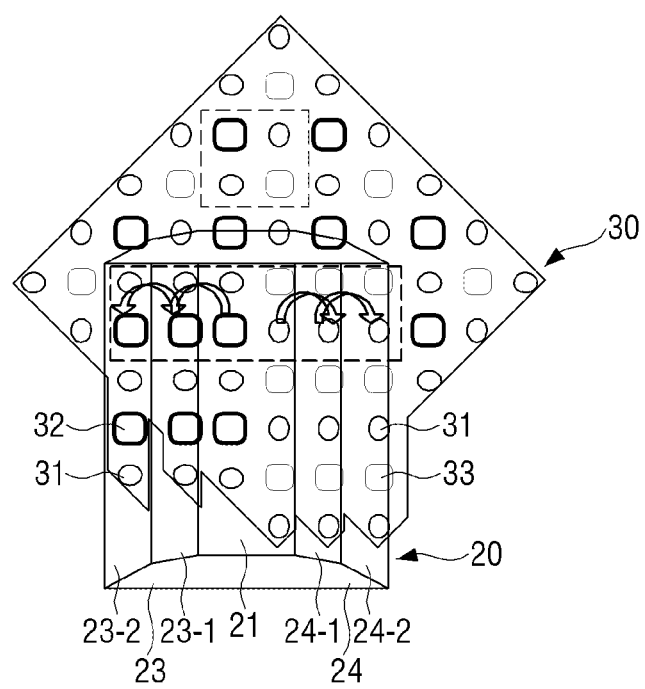
FIG. 6 is a view illustrating a case in which subpixels of a liquid crystal display panel are viewed through left and right inclined surfaces of a prism in a prism sheet for a glasses-free 3D display according to another embodiment of the present disclosure.

Referring to FIGS. 5 and 6, a prism 20 may include a central portion 21 and left and right inclined portions 23 and 24. The central portion 21 is formed to have a width corresponding to a plurality of subpixel columns of the liquid crystal display panel 30 located below in the same manner as the above-described embodiment. In the present embodiment, the central portion 21 is formed to have the width corresponding to the two subpixel columns.

The left inclined portion 23 includes two inclined surfaces 23-1 and 23-2, that is, a first left inclined surface 23-1 and a second left inclined surface 23-2. The first left inclined surface 23-1 extends downward from the left end of the upper surface of the central portion 21, and the second left inclined surface 23-2 extends downward from the first left inclined surface 23-1. A first angle θ1 of the first left inclined surface 23-1 is smaller than a second inclination angle θ2 of the second left inclined surface 23-2. Here, the first angle θ1 refers to an angle between the first left inclined surface 23-1 and a straight line L1 which is substantially parallel to the lower surface 22 of the prism 20 and passes through a point p1 where the first left inclined surface 23-1 meets the second left inclined surface 23-2. The second angle θ2 refers to an angle formed by the second left inclined surface 23-2 and the lower surface 22 of the prism 20. The first left inclined surface 23-1 may be formed so that an image formed by the subpixel columns which are located on one side and half of the plurality of subpixel columns of the liquid crystal display panel 30 corresponding to the width of the central portion 21 of the prism 20 is refracted and visible to the user. The second left inclined surface 23-2 may be also formed so that the image formed by the same subpixel columns as the first left inclined surface 23-1 is refracted and visible to the user.

For example, as illustrated in FIG. 6, when the central portion 21 of the prism 20 has a width corresponding to two subpixel columns, the first left inclined surface 23-1 of the left inclined portion 23 refracts an image formed by one left subpixel column (the column consisting of subpixels 31 and 32) of the two subpixel columns corresponding to the central portion 21 so that the user can view the image. The second left inclined surface 23-2 of the left inclined portion 23 also refracts the image formed by the one left subpixel column (the column consisting of the subpixels 31 and 32) of the two subpixel columns corresponding to the central portion 21 so that the user can view the image. In other words, the first and second left inclined surfaces 23-1 and 23-2 of the left inclined portion 23 are formed to refract the image formed by the same subpixel columns (the column including the subpixels 31 and 32) so that the image can be seen by the user. Accordingly, the left subpixel column of the two subpixel columns corresponding to the central portion 21 of the prism 20 may be dispersed and seem to be three subpixel columns by the central portion 21 of the prism 20 and the first and second left inclined surfaces 23-1 and 23-2 of the left inclined portion 23 as illustrated in FIG. 6.

The right inclined portion 24 includes two inclined surfaces 24-1 and 24-2, that is, a first right inclined surface 24-1 and a second right inclined surface 24-2. The first right inclined surface 24-1 extends downward from the right end of the upper surface of the central portion 21, and the second right inclined surface 24-2 extends downward from the first right inclined surface 24-1. A first angle θ3 of the first right inclined surface 24-1 is smaller than a second inclination angle θ4 of the second right inclined surface 24-2. Here, the first angle θ3 refers to an angle between the first right inclined surface 24-1 and a straight line L2 which is substantially parallel to the lower surface 22 of the prism 20 and passes through a point p2 where the first right inclined surface 24-1 meets the second right inclined surface 24-2. The second angle θ4 refers to an angle formed by the second right inclined surface 24-2 and the lower surface 22 of the prism 20. The first right inclined surface 24-1 may be formed so that an image formed by the subpixel columns which are located on one side and half of the plurality of subpixel columns of the liquid crystal display panel 30 corresponding to the width of the central portion 21 of the prism 20 is refracted and visible to the user. The second right inclined surface 24-2 may be formed so that the image formed by the same subpixel columns as the first right inclined surface 24-1 is refracted and visible to the user. For example, as illustrated in FIG. 6, when the central portion 21 of the prism 20 has the width corresponding to two subpixel columns, the first right inclined surface 24-1 of the right inclined portion 24 refracts an image formed by one right subpixel column (the column including subpixels 31 and 33) of the two subpixel columns corresponding to the central portion 21 so that the user can view the image. The second right inclined surface 24-2 of the right inclined portion 24 also refracts the image formed by one right subpixel column (the column including the subpixels 31 and 33) of the two subpixel columns corresponding to the central portion 21 so that the user can view the image. In other words, the first and second right inclined surfaces 24-1 and 24-2 of the right inclined portion 24 are formed to refract the image formed by the same subpixel columns (the column including the subpixels 31 and 33) so that the image can be seen by the user. Accordingly, the right subpixel column of the two subpixel columns corresponding to the central portion 21 of the prism 20 may be dispersed and seem to be three subpixel columns by the central portion 21 of the prism 20 and the first and second right inclined surfaces 24-1 and 24-2 of the right inclined portion 24 as illustrated in FIG. 6.

As described above, when the prism sheet 1 according to the present embodiment is used, since an image formed by the same subpixel column are dispersed and seems to be three, better resolution than the above-described embodiment may be obtained.

In the above description, although the prism sheet 1 according to the present disclosure is applied to the liquid crystal display panel 30 having the pentile pixel structure, the prism sheet 1 according to the present disclosure may be applied to various types of liquid crystal display panels without limitation to the structure of the liquid crystal display panel.

Figure 7:
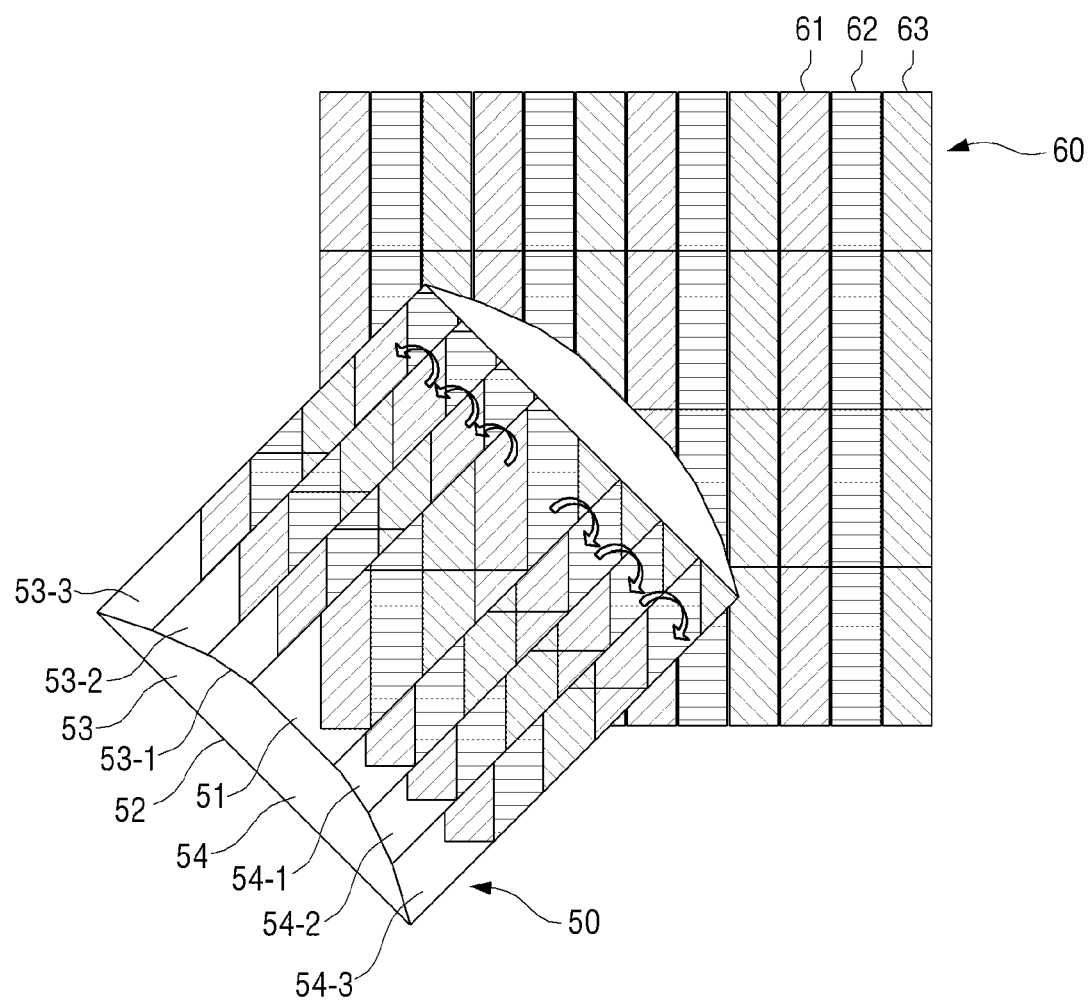
FIG. 7 is a view illustrating a case in which subpixels of a liquid crystal display panel are viewed through left and right inclined surfaces of a prism in a prism sheet for a glasses-free 3D display according to another embodiment of the present disclosure.

FIG. 7 is a view illustrating a case in which a prism sheet for a glasses-free 3D display according to an embodiment of the present disclosure is applied to a liquid crystal display panel of an RGB pixel structure.

Referring to FIG. 7, a prism 50 may include a central portion 51 and left and right inclined portions 53 and 54. The central portion 51 is formed to have a width corresponding to a plurality of subpixel columns of a liquid crystal display panel 60 located below the central portion 51 similar to the central portion 11 of the prism 10 according to the above-described embodiment. In the present embodiment, since one pixel is composed of three RGB subpixels 61, 62 and 63, the central portion 51 of the prism 50 is formed to have a width capable of covering two or more RGB subpixel columns. In FIG. 7, the prism 50 is inclined with respect to the RGB subpixels 61, 62 and 63, and the width of the central portion 51 of the prism 50 is formed to be larger than the width of two subpixel columns, but smaller than the width of three subpixel columns.

The left inclined portion 53 includes three inclined surfaces 53-1, 53-2 and 53-3. In detail, the left inclined portion 53 includes a first left inclined surface 53-1, a second left inclined surface 53-2, and a third left inclined surface 53-3. The first left inclined surface 53-1 extends downward from the left end of the upper surface of the central portion 51, and the second left inclined surface 53-2 extends downward from the first left inclined surface 53-1. The third left inclined surface 53-3 extends downward from the second left inclined surface 53-2. A first inclination angle of the first left inclined surface 53-1 is smaller than a second inclination angle of the second left inclined surface 53-2. The second inclination angle is also smaller than a inclination angle of the third left inclined surface 53-3. Here, the first inclination angle refers to an angle between the first left inclined surface 53-1 and a straight line which is substantially parallel to the lower surface 52 of the prism 50 and passes through a point where the first left inclined surface 53-1 meets the second left inclined surface 53-2. The second inclination angle refers to an angle between the second left inclined surface 53-2 and a straight line which is substantially parallel to the lower surface 52 of the prism 50 and passes through a point where the second left inclined surface 53-2 meets the third left inclined surface 53-3. Further, the third inclination angle refers to an angle formed by the third left inclined surface 53-3 and the lower surface 52 of the prism 50. The first left inclined surface 53-1 may be formed so that an image formed by the subpixel columns which are located on one side and half of the plurality of subpixel columns of the liquid crystal display panel 60 corresponding to the width of the central portion 51 of the prism 50 is refracted and visible to the user. The second left inclined surface 53-2 and the third left inclined surface 53-3 may be formed so that the image formed by the same subpixel columns as the first left inclined surface 53-1 is refracted and visible to the user.

The right inclined portion 54 includes three inclined surfaces 54-1, 54-2 and 54-3. In detail, the right inclined portion 54 includes a first right inclined surface 54-1, a second right inclined surface 54-2, and a third right inclined surface 54-3. The first right inclined surface 54-1 extends downward from the right end of the upper surface of the central portion 51, and the second right inclined surface 54-2 extends downward from the first right inclined surface 54-1. The third right inclined surface 54-3 extends downward from the second right inclined surface 54-2. A first inclination angle of the first right inclined surface 54-1 is smaller than a second inclination angle of the second right inclined surface 54-2. The second inclination angle is also smaller than a third inclination angle of the third right inclined surface 54-3. Here, the first inclination angle refers to an angle between the first right inclined surface 54-1 and a straight line which is substantially parallel to the lower surface 52 of the prism 50 and passes through a point where the first right inclined surface 54-1 meets the second right inclined surface 54-2. The second inclination angle refers to an angle between the second right inclined surface 54-2 and a straight line which is substantially parallel to the lower surface 52 of the prism 50 and passes through a point where the second right inclined surface 54-2 meets the third right inclined surface 54-3. Further, the third inclination angle refers to an angle formed by the third right inclined surface 54-3 and the lower surface of the prism 50. The first right inclined surface 54-1 may be formed so that an image formed by the subpixel columns which are located on one side and half of the plurality of subpixel columns of the liquid crystal display panel 60 corresponding to the width of the central portion 51 of the prism 50 is refracted and visible to the user. The second right inclined surface 54-2 and the third right inclined surface 54-3 may be formed so that the image formed by the same subpixel columns as the first right inclined surface 54-1 is refracted and visible to the user. Thus, the first, second, and third inclination angles of the first, second, and third right inclined surfaces 54-1, 54-2 and 54-3 are the same as the first, second, and third inclination angles of the first, second, and third left inclined surfaces 53-1, 53-2 and 53-3.

Accordingly, when the image formed by the subpixels of the liquid crystal display panel 60 is viewed through the prism 50 according to an embodiment of the present disclosure having the above-described structure, as illustrated in FIG. 7, an image formed by the subpixels located below the central portion 51 is visible through the central portion 51 of the prism 50, and the left half of the image that can be seen through the central portion 51 is visible through the first left inclined surface 53-1 of the left inclined portion 53. The left half of the image viewed through the central portion 51 is visible through the second left inclined surface 53-2 of the left inclined portion 53 like the first left inclined surface 53-1. The left half of the image viewed through the central portion 51 of the prism 50 is visible through the third left inclined surface 53-3 like the first and second left inclined surfaces 53-1 and 53-2. The right half of the image, which can be seen through the central portion 51 of the prism 50, is visible through each of the first right inclined surface 54-1, the second right inclined surface 54-2, and the third right inclined surface 54-3 of the right inclined portion 54. Therefore, the left half of the image corresponding to the subpixel column on the left side among the image formed by the subpixel columns corresponding to the central portion 51 of the prism 50 is dispersed and seems to be four by the central portion 51 of the prism 50 and the first, second, and third left inclined surfaces 53-1, 53-2 and 53-3 of the left inclined portion 53 as illustrated in FIG. 7. Also, the right half of the image corresponding to the subpixel column on the right side among the image formed by the subpixel columns corresponding to the central portion 51 of the prism 50 is dispersed and seems to be four by the central portion 51 of the prism 50 and the first, second, and third right inclined surfaces 54-1, 54-2 and 54-3 of the right inclined portion 54 as illustrated in FIG. 7.

As described above, when the prism sheet according to an embodiment of the present disclosure is applied to, the phenomenon of moire pattern may be eliminated, and crosstalk in which a right-eye image and a left-eye image are mixed may be eliminated. In addition, the prism sheet according to the present disclosure may have an advantage that it can be used regardless of the structure of the liquid crystal display panel. Accordingly, the prism sheet according to the present disclosure may be applied to liquid crystal display panels using a pentile pixel structure, an RGB pixel structure, and the like.

Figure 8:
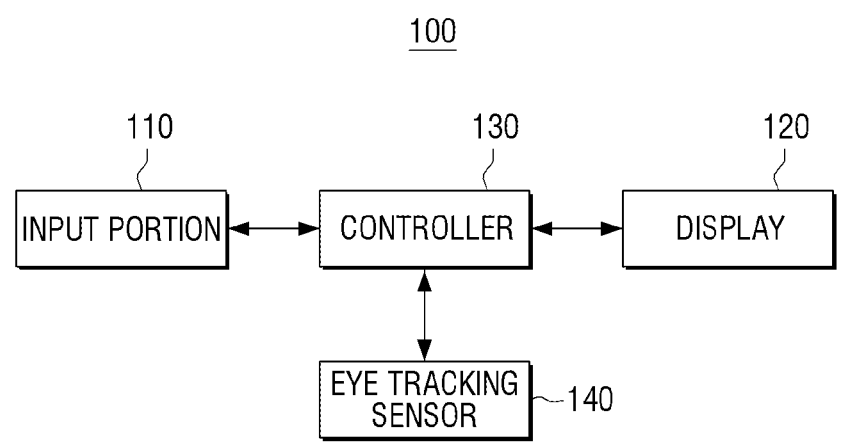
FIG. 8 is a functional block diagram illustrating a display apparatus according to an embodiment of the present disclosure.

FIG. 8 is a block diagram illustrating the configuration of a display apparatus to which a prism sheet for a glasses-free 3D display according to an embodiment of the present disclosure is applied. Referring to FIG. 8, a display apparatus 100 may include an input portion 110, a display 120, and a controller 130.

The input portion 110 receives a user command. The user command may be input through a remote controller, or keys, buttons, a touch screen, or the like provided on a main body of the display apparatus 100.

The display 120 displays image frames. For example, the display 120 may display a three-dimensional (3D) image according to a user command input to the input portion 110. The display 120 may include a liquid crystal display panel 30 and a prism sheet 1 according to an embodiment of the present disclosure provided on the front surface of the liquid crystal display panel 30. The liquid crystal display panel 30 may be implemented as a liquid crystal display (LCD), an organic light emitting diode (OLED), or the like.

The controller 130 controls the overall operation of the display apparatus 100. For example, the controller 130 may control the display 120 to provide a 3D image according to the user command input to the input portion 110.

The controller 130 may be electrically connected with an eye tracking sensor 140 that can track the position of the user, in detail, the eye position of the user. A built-in camera provided in the display 120 may be used as the eye tracking sensor 140. For example, the controller 130 may obtain the coordinates of the eyes of the user using the value input from the eye tracking sensor 140. The controller 130 may obtain the eye coordinates by tracking the eye position of the user using the eye tracking sensor 140, map an image for the left eye and an image for the right eye to match the eye coordinates, and display the image on the liquid crystal display panel 30.

Figure 9:
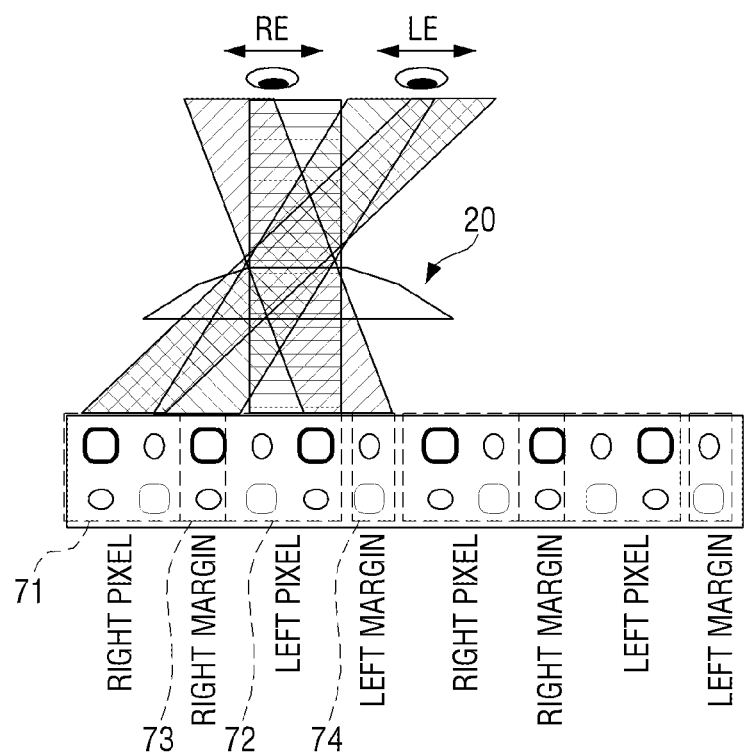
FIG. 9 is a view for explaining a case where eye tracking is performed in a display apparatus using a prism sheet for a glasses-free 3D display according to an embodiment of the present disclosure.

At this time, in order to make the data processing smooth in eye tracking, the pixel structure may be configured as illustrated in FIG. 9 to output the image. In other words, the pixel structure is formed so that the pixel next to the left pixel 72 outputting the image for the left eye is set to output the left margin 74, and the pixel next to the right pixel 71 outputting the image for the right eye is set to output the right margin 73. The right margin 73 or the left margin 74 prevents the pixel from outputting the image output by the right pixel 71 or the left pixel 72. For example, a pixel corresponding to the right margin 73 or the left margin 74 is not configured to output an image. When a margin is provided between the image for the right eye and the image for the left eye as described above, the data processing may be made smooth during eye tracking, the crosstalk may be zero (0), and the moire pattern may be not generated.

As described above, the prism sheet according to the present disclosure may be used not only for a 3D only display apparatus but also for a 2D/3D combined display apparatus in which 2D contents and 3D contents may be selected by the user.

Figure 10:
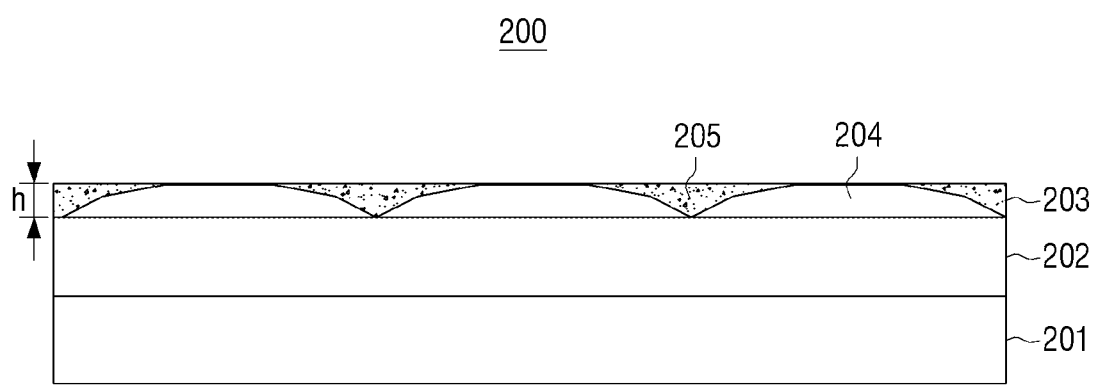
FIG. 10 is a view schematically illustrating a display panel of a 2D/3D combined display apparatus formed using a prism sheet for a glasses-free 3D display according to an embodiment of the present disclosure.

FIG. 10 is a cross-sectional view schematically illustrating the structure of a 2D/3D combined glasses-free 3D display panel using a prism sheet for a glasses-free 3D display according to an embodiment of the present disclosure.

A 2D/3D combined glasses-free 3D display panel 200 may include a liquid crystal display panel 201, a cover glass 202 provided on the liquid crystal display panel 201, and a 2D/3D switching prism panel 203 disposed on the cover glass 202.

The 2D/3D switching prism panel 203 is formed of liquid crystal. In the 2D mode, the 2D/3D switching prism panel 203 operates optically as if there is no prism sheet 1 like the above-described embodiment on the screen. In the 3D mode, the 2D/3D switching prism panel 203 operates as if the prism sheet 1 like the above-described embodiment is present on the screen. The 2D mode or the 3D mode may be selected by the user using a button or a touch screen provided on the display apparatus 200.

When the 2D/3D switching prism panel 203 is formed with the same structure as the prism sheet 1 according to the present disclosure, the thickness of the liquid crystal may be reduced compared with the conventional 2D/3D switching panel using the lenticular lens. In FIG. 10, the reference numeral 204 denotes a polycarbonate prism formed in the form of a prism sheet 1 according to an embodiment of the present disclosure, and the reference numeral 205 denotes a liquid crystal in spaces between the prisms 204.

Figure 11:
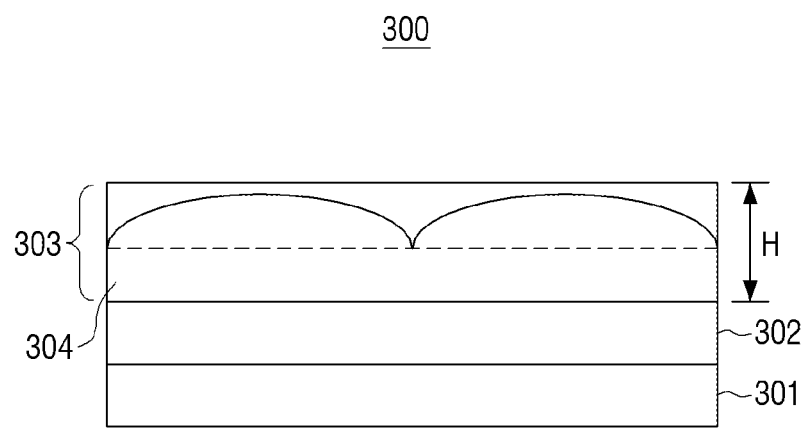
FIG. 11 is a view schematically illustrating a structure of a display panel of a 2D/3D combined display apparatus using a 2D/3D switching sheet according to the related art.

FIG. 11 is a view schematically illustrating a 2D/3D combined glasses-free 3D display panel according to the related art using a 2D/3D switching sheet made using a lenticular lens.

Referring to FIG. 11, a 2D/3D switching panel 303 is disposed in a cover glass 302 provided on a liquid crystal display panel 301. Since the 2D/3D switching panel 303 according to the related art is manufactured by using liquid crystal and a layer 304 corresponding to the body portion of the lens is required, the thickness H thereof is thicker than the thickness h of the 2D/3D switching prism panel 203 according to the present disclosure.

Accordingly, with the prism sheet according to the present disclosure, the amount of liquid crystal may be smaller than the amount of liquid crystal used in manufacturing the 2D/3D switching panel according to the prior art, so the material cost may be reduced.

The present disclosure has been described above in an illustrative manner. The terms used herein are for the purpose of description and should not be construed as limiting. Various modification and variations of the present disclosure are possible in light of the above teachings. Therefore, unless otherwise indicated, the present disclosure may be embodied within the scope of the claims.

The invention claimed is:

1. A prism sheet for a glasses-free 3D display, which is provided on an upper surface of a liquid crystal display panel, the prism sheet comprises:
   a plurality of prisms arranged in parallel,
   wherein each of the plurality of prisms comprises,
   a central portion including an upper surface and a lower surface that are parallel to each other, the central portion including a width corresponding to at least two subpixel columns of the liquid crystal display panel;
   a left inclined portion provided on a left side of the central portion, the left inclined portion configured to refract an image formed by a left half subpixel column of a plurality of subpixel columns covered by the central portion, wherein the image formed by the left half subpixel column is visible to a user; and
   a right inclined portion provided on a right side of the central portion, the right inclined portion configured to refract an image formed by a right half subpixel column of the plurality of subpixel columns covered by the central portion, wherein the image formed by the right half subpixel column is visible to the user,
   wherein the plurality of prisms are arranged so that a left inclined portion of a first prism and a right inclined portion of a second prism are in contact with each other, and
   wherein the left inclined portion includes a width corresponding to at least one subpixel column and the right inclined portion includes a width corresponding to at least one subpixel column.

2. The prism sheet for a glasses-free 3D display of claim 1, wherein
   when the liquid crystal display panel comprises a pentile pixel structure, the central portion is formed to cover two subpixel columns of the liquid crystal display panel.

3. The prism sheet for a glasses-free 3D display of claim 1, wherein
   when the liquid crystal display panel comprises a RGB pixel structure, the central portion is formed to cover three subpixel columns of the liquid crystal display panel.

4. The prism sheet for a glasses-free 3D display of claim 1, wherein
   the left inclined portion includes a first left inclined surface and a second left inclined surface with different inclination angles, and
   wherein each of the first and second left inclined surfaces refracts the image formed by the left half subpixel column of the plurality of subpixel columns covered by the central portion, wherein the image formed by the left half subpixel column is visible to the user.

5. The prism sheet for a glasses-free 3D display of claim 1, wherein
   the right inclined portion includes a first right inclined surface and a second right inclined surface with different inclination angles, and
   wherein each of the first and second right inclined surfaces refracts the image formed by the right half subpixel column of the plurality of subpixel columns covered by the central portion, wherein the image formed by the right half subpixel column is visible to the user.

6. The prism sheet for a glasses-free 3D display of claim 1, wherein
   each of the left inclined portion and the right inclined portion includes at least three inclined surfaces with different inclination angles.

7. The prism sheet for a glasses-free 3D display of claim 1, wherein the left inclined portion and the right inclined portion are symmetrical with respect to a center line passing through a center of the central portion.

\* \* \* \* \*